Dec. 27, 1949     J. H. PALMER     2,492,437
STRESS CONE SEAL FOR ELECTRIC CABLE SYSTEMS
Filed Sept. 25, 1945
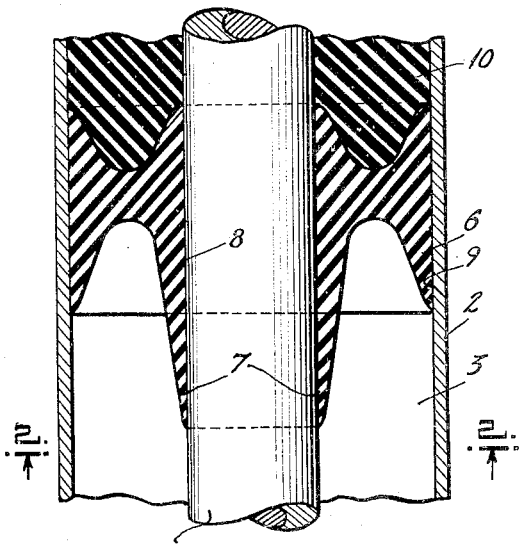
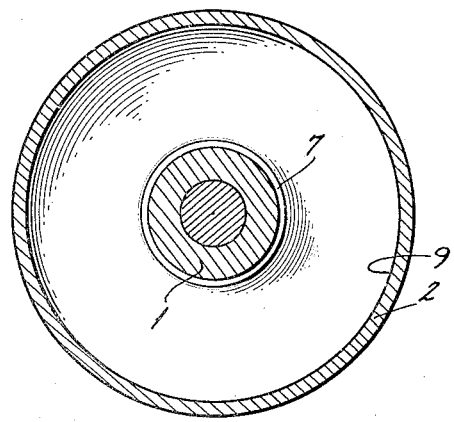
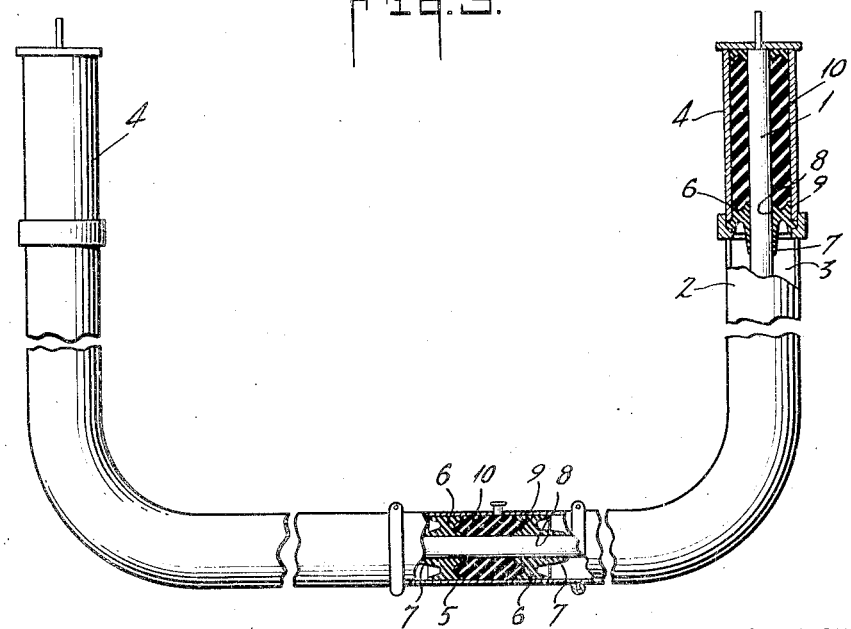
INVENTOR
JOHN H. PALMER
ATTORNEY Patented Dec. 27, 1949

2,492,437

UNITED STATES PATENT OFFICE 2,492,437

STRESS CONE SEAL FOR ELECTRIC CABLE SYSTEMS

John H. Palmer, Scarsdale, N. Y., assignor to Phelps Dodge Copper Products Corporation, Dover, Del., a corporation of Delaware Application September 25, 1945, Serial No. 618,449

1 Claim. (Cl. 174—20)

The present invention relates to electric cable systems adapted for high voltages, more particularly to that class of cables which are enclosed within a pipe or tube filled with an electrical conducting fluid pressure medium for example water, and has for its object to provide a means for terminating the fluid pressure medium at or near the terminals and in the sectionalizing joints. Such termination allows a change from conducting medium surrounding the cable, to insulating fluid or to solid insulating material surrounding it. In making such a change, in the type of cable with a metallic sheath, it is customary to build a stress cone on the cable, that is, to gradually increase the cable insulation thickness in order to avoid any sudden change in the electric field, which might cause excessive electric stress at the surface of the insulation. It is customary to cover such a stress cone with a conducting layer in order to extend the low potential covering of the outer surface of the cable insulation out to a position where there is sufficient additional insulation to terminate it, without danger of electric breakdown of the cable at this position. I propose to accomplish this same effect for the cable immersed in conducting fluid by terminating the fluid by means of a rubber or rubberlike separator of such shape that the material of the separator will form a stress cone, the surface of contact with the conducting fluid forming the conducting layer over the cone. By rubberlike, I mean to include any elastic insulating material, the surface of which may be pressed into intimate fluidtight contact with another surface by the application of pressure. I also propose to make this separator of such shape that increase in pressure of the medium on either or both sides of it will increase the contact pressure between the separator and its enclosing tube, and between the separator and the cable insulation surface, thereby producing a tighter seal.

Such termination of the fluid medium may be required for any one of several purposes, such as the following:

1. Termination of a cable. It is necessary to change from the conducting fluid surrounding the cable to an insulation medium, with a seal which will not permit mixing of the two media. Such a separation may occur at the terminal itself or at some distance from the terminal.

2. Sectionalization of the conducting fluid space of the system. Here, it is necessary to change from conducting fluid to a solid which will seal the conducting fluid of one part of the system from that of some other part of the system, and to change back again to conducting fluid, thereby requiring two of the separators described above.

It is recognized that the principle of the pressure seal described above is an old one and has been used for many applications in the past. The novel feature of this invention is the shaping of this pressure seal to form a stress cone at the surface of fluid contact.

The foregoing and other features of my invention will now be described in connection with the accompanying drawing forming part of this specification in which I have represented my stress cone in its preferred form, after which I shall point out in the claims those features which I believe to be new and of my own invention.

In the drawings:

Figure 1 is a longitudinal cross-section of my separator.

Figure 2 is an end view thereof.

Figure 3 is a diagrammatic view in part section showing my separator, both in the terminals and in the sectionalizing joint, of the cable system.

In carrying out my invention, 1 is an insulated conductor in a pipe or tube 2, which is filled with conducting fluid 3. This cable system has a terminal 4 at each end and a sectionalizing joint 5, all of which employ the stress cone seal 6. 7 is the fluid contact surface of the separator forming a stress cone and 8 and 9 are the surfaces which form seals between the cable insulation and the surrounding tube respectively. 10 is the insulating material filling the terminal or joint.

I have found that rubber compound is a desirable material of which to make my separator but I want it distinctly understood that I do not want to be limited to the use of this material as any rubber-like material can be used.

I wish it distinctly understood that my stress cone and its use in a cable system herein above described and illustrated in the accompanying drawing, is in the form in which I desire to construct it and that changes or variations may be made as may be convenient or desirable without departing from the salient features of my invention and I therefore intend the following claim to cover such modifications as naturally fall within the lines of invention.

I claim:

A terminal for an electrical conducting fluid pressure cable system comprising an insulated cable enclosed within a tubular enclosure containing an electrical conducting fluid pressure medium, the terminals comprising an insulating tubular enclosure in which the cable insulation is terminated, filled with solid insulating material, a separator interposed between the electrical conducting fluid pressure medium of the cable system proper, and the insulating material of the terminal, the separator of such shape that its surface of contact with the electrical conducting fluid will form a conducting conical surface designed to reduce concentration of electric stress at the junction between the conducting fluid and the insulating material of the terminal, and also shaped in such a way that the fluid pressure against its surfaces will produce large components of force normal to the cable insulation surface and to the enclosure surface.

JOHN H. PALMER.

REFERENCES CITED

The following references are of record in the file of this patent:

UNITED STATES PATENTS

| Number | Name | Date |
| --- | --- | --- |
| 1,588,804 | Parrish | June 15, 1926 |
| 2,173,327 | Channell | Sept. 19, 1939 |
| 2,213,875 | Webb | Sept. 3, 1940 |

FOREIGN PATENTS

| Number | Country | Date |
| --- | --- | --- |
| 524,388 | Great Britain | Aug. 6, 1940 |